United States Patent
Nakatani et al.

(10) Patent No.: US 9,718,931 B2
(45) Date of Patent: Aug. 1, 2017

(54) METHOD OF MAKING BASE STABILIZED POLYMERS, POLYMER COMPOSITIONS AND ARTICLES CONTAINING SUCH POLYMERS

(71) Applicant: Firestone Polymers, LLC, Akron, OH (US)

(72) Inventors: Kenji Nakatani, Tokyo (JP); Mark N. DeDecker, North Canton, OH (US); Joseph P. Padolewski, Copley, OH (US); James H. Pawlow, Schwenksville, PA (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 14/405,501

(22) PCT Filed: Jun. 5, 2013

(86) PCT No.: PCT/US2013/044330
§ 371 (c)(1),
(2) Date: Dec. 4, 2014

(87) PCT Pub. No.: WO2013/184813
PCT Pub. Date: Dec. 12, 2013

(65) Prior Publication Data
US 2015/0166737 A1    Jun. 18, 2015

Related U.S. Application Data

(60) Provisional application No. 61/656,124, filed on Jun. 6, 2012.

(51) Int. Cl.
| | |
|---|---|
| C08J 3/20 | (2006.01) |
| B60C 1/00 | (2006.01) |
| C08C 19/25 | (2006.01) |
| C08F 236/10 | (2006.01) |
| C08F 8/00 | (2006.01) |
| C08L 15/00 | (2006.01) |
| C08C 2/06 | (2006.01) |
| C08C 19/44 | (2006.01) |
| C08K 3/00 | (2006.01) |
| C08K 5/5419 | (2006.01) |
| C08K 5/56 | (2006.01) |

(52) U.S. Cl.
CPC ............... *C08J 3/203* (2013.01); *B60C 1/00* (2013.01); *B60C 1/0016* (2013.04); *B60C 1/0025* (2013.04); *C08C 2/06* (2013.01); *C08C 19/25* (2013.01); *C08C 19/44* (2013.01); *C08F 8/00* (2013.01); *C08F 236/10* (2013.01); *C08K 3/0033* (2013.01); *C08K 5/5419* (2013.01); *C08K 5/56* (2013.01); *C08L 15/00* (2013.01); *C08J 2347/00* (2013.01)

(58) Field of Classification Search
CPC .......... C08L 101/10; C07F 7/18; C08F 36/06; B60C 1/0016
See application file for complete search history.

(56) References Cited

U.S. PATENT DOCUMENTS

| | | | | |
|---|---|---|---|---|
| 2,821,232 | A | * | 1/1958 | Wolf .......................... 152/209.1 |
| 6,008,295 | A | | 12/1999 | Takeichi et al. |
| 6,255,404 | B1 | * | 7/2001 | Hogan et al. ............... 525/326.5 |
| 6,369,167 | B1 | | 4/2002 | Morita et al. |
| 6,653,430 | B1 | | 11/2003 | Soga et al. |
| 7,342,070 | B2 | | 3/2008 | Tsukimawashi et al. |
| 2004/0254301 | A1 | | 12/2004 | Tsukimawashi et al. |
| 2009/0163668 | A1 | | 6/2009 | Yamada et al. |
| 2012/0108737 | A1 | | 5/2012 | Shibata et al. |

OTHER PUBLICATIONS

Kim, Dong Seok, International Search Report with Written Opinion from PCT/US2013/044330, 11 pp. (Aug. 23, 2013).

* cited by examiner

*Primary Examiner* — Kuo-Liang Peng
(74) *Attorney, Agent, or Firm* — Meredith E. Hooker; Harry J. Gwinnell

(57) ABSTRACT

A method of making a polymer with stable Mooney viscosity and molecular weight is described. A conjugated diolefin is reacted in a hydrocarbon solvent in the presence of an initiator to form a polymer. After forming the polymer, alkoxy silane terminal functionalizing groups are bonded to the polymer. A dialkoxysilane stabilizing agent is then added to the polymer in combination with a base material. The polymer is then desolvatizing, resulting in a polymer with stable Mooney viscosity and molecular weight, even over prolonged periods of time. Compositions and articles containing the polymer are also described.

17 Claims, 1 Drawing Sheet

METHOD OF MAKING BASE STABILIZED POLYMERS, POLYMER COMPOSITIONS AND ARTICLES CONTAINING SUCH POLYMERS

CROSS-REFERENCE TO RELATED APPLICATIONS

The present application may relate to subject matter disclosed in one or more of U.S. patent application Ser. No. 14/405,576 entitled "Method of Making Stabilized Polymers, Polymer Compositions, and Articles Containing Such Polymers", 14/405,604 entitled "Method of Making Iminosilane Stabilized Polymers, Polymer Compositions, and Articles Containing Such Polymers", and 14/405,624 entitled "Method of Making Silanol and Silanediol Stabilized Polymers, Polymer Compostions, and Articles Containing Such Polymers." Each of the aforementioned applications is filed of even date herewith and assigned to an entity common hereto and shares an inventor common hereto. Further, the entirety of each and every one of the aforementioned applications is incorporated herein by reference for all purposes.

TECHNICAL FIELD

The field of art to which this invention generally pertains is conjugated diolefin polymers, methods of producing the same, and compositions and articles containing such polymers.

BACKGROUND

There is a constant search in the area of elastomeric polymers, such as styrene-butadiene rubbers, to control Mooney viscosity (hereinafter the use of Mooney viscosity will refer to conventional Mooney$_{ML1+4/100}$ viscosity measures unless otherwise indicated). Note, for example U.S. Pat. Nos. 5,659,056; 6,255,404; 6,393,167; 7,342,070; and published patent application No. 2009/0163668, the disclosures of which are incorporated by reference. Mooney viscosity creep with aging has become even more pronounced with the movement from batch to continuous polymerization.

Advantageous properties have been imparted to polymers which are typically terminated using a number of different functional compounds, including silane containing compounds, to yield silane end-capped polymers. Note also, for example, U.S. Pat. Nos. 3,244,664 and 4,185,042, the disclosures of which are incorporated by reference. This alkoxysilane termination may also result in an increase in the Mooney viscosity of the treated polymer. However, upon the subsequent process of desolventization of the alkoxysiloxane terminated polymers through the use of either steam or heated water, an even larger increase in Mooney viscosity often occurs during the hydrolysis of the alkoxysiloxane end groups such as pendant —SiOR groups, thereby leading to coupling of the polymer via formation of Si—O—Si bonds between two groups. Accordingly, many of the processes tried in the past do not actually prevent an increase in Mooney viscosity, but only slow the rate of the hydrolysis reaction and, therefore, the rate of coupling of the polymer. Over a period of time, for example during storage, the slow hydrolysis of the end groups will occur, thereby continuing the problem of increased Mooney viscosity and coupling of the alkoxysilane terminated polymers with aging.

Thus, while attempts have been made to reduce the rate of the hydrolysis reaction that results in the coupling of the alkoxysilane end groups of the polymers, the art has not provided a means or method by which to stabilize the polymer upon aging and essentially stop or slow down the coupling of the alkoxy silane terminated polymers over time.

BRIEF SUMMARY OF THE INVENTION

The present invention solves the above-mentioned problems through the use of methods for controlling the increase in Mooney viscosity and molecular weight of functionalized polymers, particularly during aging, e.g., storage over long periods of time. In embodiments, the present methods involve reacting a conjugated diolefin in a hydrocarbon solvent in the presence of an initiator to form a polymer. Alkoxy and/or aryloxy silane terminal functionalizing groups may then be bonded to the polymer. Alkoxysilane stabilizing agents may then be added to the polymer in combination with a base. The polymer is then typically desolvatized, resulting in a polymer with stable Mooney viscosity.

Aspects of the invention include: the stabilizing agent being a dialkoxysilane; desolvatizing by drum drying, direct drying, or steam desolvatizing; the stabilizing agent being a diaryldialkoxysilane; the stabilizing agent being a diphenyldiethoxysilane; the stabilizing agent being a diphenyldimethoxysilane; the initiator being a butyl lithium; the hydrocarbon solvent being one or more hexanes; the conjugated diolefin being a 1,3-butadiene; the polymerizing step including the presence of an aromatic vinyl compound; the aromatic vinyl compound being a styrene; and the base being sodium hydroxide.

Aspects of the invention include: drying the polymer after desolvatizing; the polymers produced according to methods of this invention; rubber compositions containing fillers and the polymers produced according to methods of this invention; and tires containing rubber compositions of this invention.

These and other objects, aspects, embodiments and features of the invention will become more fully apparent when read in conjunction with the following detailed description.

DETAILED DESCRIPTION OF THE INVENTION

Figure 1:
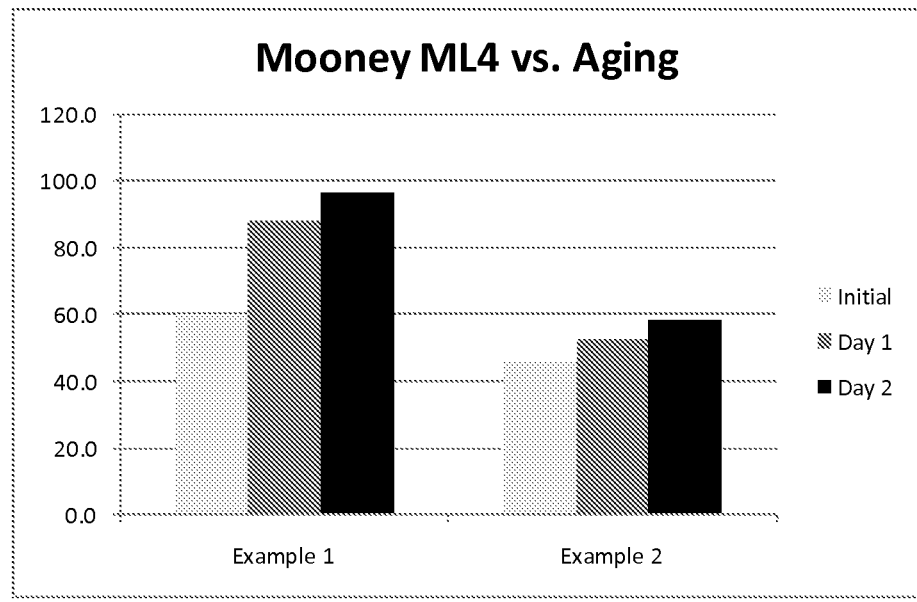
FIG. 1 shows Mooney viscosity and aging data for various samples.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Attempts to address Mooney viscosity deterioration in polymers are described, for example, in U.S. Pat. No. 5,659,056, which describes a process to treat the polymer prior to desolventization with a $C_1$ to $C_{12}$ aliphatic or $C_6$ to $C_{12}$ cycloaliphatic or aromatic carboxylic acid viscosity stabilizing agent soluble in the solvent used to prepare the polymer. U.S. Pat. No. 6,255,404 describes a method for stabilizing the Mooney viscosity of a siloxane-terminated polymer having at least one hydrolyzable substituent on the silane end group with an alkyl trialkoxysilane viscosity stabilizing agent. U.S. Pat. No. 6,369,167 teaches improving polymer properties by reacting the terminal end groups of the polymer with a compound having alkylideneamino groups. U.S. Pat. No. 7,342,070 teaches improving polymer properties by bonding a primary amino group and an alkoxysilyl group to the polymer chain. And U.S. Pub. No. 2009/0163668 describes a method of improving polymer properties by reacting the active end groups of the polymer with a specific low molecular weight compound having a secondary amino group in which a hydrogen atom is substituted with a triorgano-substituted silyl group, an organic group having an N atom not adjacent to the N atom of the secondary amino group, and at least one alkoxysilyl group or a specific low molecular compound containing a heterocycle having a secondary amino group in which a hydrogen atom is substituted with a triorgano-substituted silyl group and at least one alkoxysilyl group. Alkoxysilane-terminated polymers are also well known in the art and have been prepared, for example, as described in U.S. Pat. No. 6,255,404 to Hogan, the disclosure of which is incorporated by reference. Issues still exist, however, with controlling Mooney viscosity and molecular weight, especially over time, for example, in long term storage.

The present invention not only produces polymers with acceptable Mooney viscosity levels and molecular weight as produced, but controls these values over time, including over long term storage. The process of the present invention is particularly applicable to any polymer having a terminal functionalized end group having a hydrolyzable substituent which, when hydrolyzed, is subject to cross linking with other hydrolyzed groups. The hydrolyzable group is typically a pendant —SiOR group wherein R is an alkyl, cycloalkyl, or aromatic group capable of coupling with a like or similar pendant —SiOR group to form an Si—O—Si bond.

Polymers that can be stabilized in accordance with the process of the present invention can be any conjugated diolefins known in the art including polybutadiene, polyisoprene, and the like, and copolymers thereof with monovinyl aromatics such as styrene, alpha methyl styrene and the like, and trienes such as myrcene. Thus, the polymers include diene homopolymers and copolymers thereof with aromatic vinyl compounds. Exemplary diene homopolymers are those prepared from diolefin monomers having from about 4 to about 12 carbon atoms. Exemplary vinyl aromatic polymers are those prepared from monomers having from about 8 to about 20 carbon atoms.

Preferred polymers include diene homopolymers such as polybutadiene and polyisoprene and copolymers such as styrene butadiene rubber (SBR). Polymers and copolymers can comprise from 100 to about 20 percent by weight of diene units and from 0 to about 80 percent by weight of monovinyl aromatic hydrocarbon or triene units, totaling 100 percent. The copolymers may be random copolymers or block copolymers. Block copolymers include, but are not limited to, poly(styrene-butadiene-styrene), which are thermoplastic polymers. The polymers utilized and treated in accordance with the process of the present invention display utility in a number of applications, including, for example, use in the manufacture of tires.

The polymers employed in the practice of this invention can be prepared by employing any polymerization techniques. These techniques include, but are not limited to, cationic and anionic techniques, transition metal or coordination catalyst techniques, emulsion techniques, etc. Similarly, any organic alkali metals and/or the organic alkali earth metals may be used in the polymerization process of the present invention, including alkyllithiums such as n-butyllithium, s-butyllithium and t-butyllithium, alkylenedilithiums such as 1,4-dilithiobutane, phenyllithium, stilbenelithium, lithiumnaphthalene, sodiumnaphthalene, potassiumnaphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, diethylaminobarium, and barium stearate.

Polymerization of the polymers may be conducted in the presence of an organolithium anionic initiator catalyst composition. The organolithium initiator employed may be any anionic organolithium initiators useful in the polymerization of 1,3-diene monomers. In general, the organolithium compounds include hydrocarbon containing lithium compounds of the formula $R(Li)_x$ wherein R represents hydrocarbon groups containing from one to about 20 carbon atoms, and preferably from about 2 to about 8 carbon atoms, and x is an integer from 1 to 2. Although the hydrocarbon group is preferably an aliphatic group, the hydrocarbon group may also be cycloaliphatic or aromatic. The aliphatic groups may be primary, secondary, or tertiary groups although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octa-decyl. The aliphatic groups may contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organolithium compounds which are useful as anionic initiators in the polymerization of conjugated dienes in accordance with the process of the present invention include, but are not limited to, n-butyl lithium, s-butyl lithium, n-propyl lithium, isobutyl lithium, tertiary butyl lithium, amyl-lithium, and cyclohexyl lithium. Mixtures of different lithium initiator compounds also can be employed preferably containing one or more lithium compounds such as $R(Li)_x$, R and x as defined above. Other lithium catalysts which can be employed alone or in combination with the hydrocarbyl lithium initiators are tributyl tin lithium, lithium dialkyl amines, lithium dialkyl phosphines, lithium aklyl aryl phosphines and lithium diaryl phosphines. The preferred organolithium initiator is n-butyl lithium and in situ produced lithium hexamethylenimide initiator.

The amount of initiator required to effect the desired polymerization can be varied over a wide range depending upon a number of factors such as the desired polymer molecular weight, the desired 1,2- and 1,4-content of the conjugated diene, and the desired physical properties for the polymer produced. In general, the amount of initiator utilized may vary from as little as 0.2 millimole of lithium per 100 grams of monomers up to about 100 millimoles of lithium per 100 grams of monomers, depending upon the desired polymer molecular weight (typically 1,000 to 10,000,000 grams/mole average molecular weight).

The polymerizations of the present invention may be conducted in an inert solvent and would consequently be solution polymerizations. The term "inert solvent" means that the solvent does not enter into the structure of the resulting polymer, does not adversely affect the properties of the resulting polymer, and does not adversely affect the activity of the catalyst employed. Suitable inert solvents include hydrocarbon solvents which may contain aliphatic, aromatic or cycloaliphatic hydrocarbons such as hexane, pentane, toluene, benzene, cyclohexane and the like. Ethers such as tetrahydrofuran and tertiary amines such as triethylamine and tributylamine may also be used as solvents, but these will modify the polymerization as to styrene distribution, vinyl content and rate of reaction. The preferred solvents are aliphatic hydrocarbons and of these solvents, hexane is particularly preferred, including blends and mixtures of hexanes, e.g., linear and branched, including such things as cyclohexane alone or mixed with other forms of hexane.

Polymerization conditions such as temperature, pressure and time are well known in the art for polymerizing the monomers as described with the anionic initiator as described. For example, for illustrative purposes only, the temperature employed in the polymerization is generally not critical and may range from about −60° C. to about 150° C. Preferred polymerization temperatures may range from about 25° C. to about 130° C. for a polymerization time of a few minutes to up to 24 hours or more, and employing pressures generally sufficient to maintain polymerization admixtures substantially in the liquid phase, preferably at or near atmospheric pressure, depending on the temperature and other reaction parameters. Polymerization of any of the above-identified monomers in the presence of an organolithium initiator results in the formation of a "living" polymer. The lithium proceeds to move down the growing chain as polymerization continues. Throughout formation or propagation of the polymer, the polymeric structure may be anionic and living. In other words, a carbon anion is present. A new batch of monomer subsequently added to the reaction can add to the living ends of the existing chains and increase the degree of polymerization. A living polymer, therefore, may include a polymeric segment having an anionic reactive end. Reference to anionically polymerized polymers or anionically polymerized living polymers refers to those polymers prepared by anionic polymerization techniques.

In order to promote randomization in copolymerization and to control vinyl content, one or more modifiers may optionally be added to the polymerization ingredients. Amounts range from 0 to about 90 or more equivalents per equivalent of lithium. Compounds useful as modifiers are typically organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); tetrahydrofuran (THF), THF oligomers linear and cyclic oligomeric oxolanyl alkanes and the like. Particular examples of these modifiers include potassium t-amylate and 2,2'-di(tetrahydrofuryl) propane. These modifiers are further described in U.S. Pat. No. 4,429,091, the disclosure of which is incorporated by reference.

Polymerization is begun by charging a blend of the monomer(s) and solvent to a suitable reaction vessel, followed by the addition of the modifier(s) and the initiator solution previously described. The procedure is carried out under anhydrous, anaerobic conditions. The reactants may be heated to a temperature of from about 23° C. to about 120° C., and are typically agitated for about 0.15 to about 24 hours. After polymerization is complete, the product may be removed from the heat and terminated with a functional end group as is conventionally done in the art, although termination could also be done without removal of heat. Prior to terminating the polymerization reaction with a functional end group, a coupling agent may be added to the polymerization reaction to increase the Mooney viscosity to a desired range. Tin coupling agents such as tin tetrachloride ($SnCl_4$) are well known in the art and may be added in varying amounts, typically in amounts of 0 to about 0.9 mole equivalents functionality per each mole equivalent of anionic initiator depending upon the desired Mooney viscosity of the polymer.

The functional terminated polymers described above may include any polymer having a terminal end group in which the end group contains one or more hydrolyzable pendant substituents. Exemplary alkoxy terminal functionalizing groups bonded to polymers are silane terminated polymers represented by the following formula:

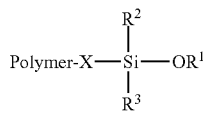

wherein X may be present or not present and represents a linking atom, chemical bond, or a linking group (e.g., oxygen, sulfur, etc.), and wherein $R^1$ is a $C_1$ to $C_{18}$ alkyl, $C_1$ to $C_{18}$ alkyl group containing a heteroatom such as nitrogen or oxygen, $C_4$ to $C_8$ cycloalkyl, or $C_6$ to $C_{18}$ aromatic group, and $R^2$ and $R^3$ may be the same or different and are selected from the group consisting of —$OR^1$, a $C_1$ to $C_{18}$ alkyl, $C_4$ to $C_8$ cycloalkyl, or $C_6$ to $C_{18}$ aromatic group. A preferred functionalizing agent would be 3-(1,3,-dimethylbutylidene) aminopropyltriethoxysilane (DMBAPTES), represented in the above formula by $R^1$ being $C_2$, forming an ethoxy group, $R^2$ being the same group as $OR^1$ and $R^3$ being a 3-(1,3-dimethylbutylidene)aminopropyl group. In addition to the formula representation shown above, additional polymer chains "Polymer" could also be bonded through the $R^2$ and/or the $OR^1$ positions as well.

The process of the present invention, prior to quenching, drying or removing the solvent, e.g., by drum drying, with steam or heated water, or direct drying (e.g., List AG technology), and optionally further drying the polymer, adds one or more dialkoxysilane stabilizing agents in combination with abuse material to the polymer. Preferred viscosity and molecular weight stabilizing agents are diaryldialkoxysilanes, and in particular, diphenyldiethoxysilane (DPDES) and diphenyldimethoxysilane (DPDMS). The base added in combination with the stabilizing agent to the polymer can be any known base which acts as a condensation catalyst such as alkaline earth hydroxides, including but not limited to calcium hydroxide; and/or lithium hydroxide, potassium hydroxide, calcium hydroxide, sodium or potassium alkoxide, aluminium alkoxide, amines and ammonia, and particularly sodium hydroxide.

The viscosity stabilizing agents of the present invention can be employed in varying amounts and the amount employed is particularly dependent upon the type of alkoxysilane employed as the stabilizing agent since reaction with the siloxane functional polymers is dependent upon the molar ratio of the added alkoxysilane to the siloxane functionally terminated polymer. Nevertheless, for the alkoxysilane stabilizing agents, preferred amounts may range from about 0.5 to about 50 mole equivalents per mole equivalent of anionic initiator, and more preferably, a range of from about 1 mole to about 20 mole equivalents per mole equivalent of anionic initiator is desired, with 2 to 8 mole equivalents most typically used. The amount of base used is typically 1 to 20 mole equivalents to initiator, or in the case of steam desolventizing, sufficient base to increase the pH of the water in the desolvatizer to an effective level of at least a pH of about 9.

The viscosity stabilizing agents of the present invention react with the functional end groups of the polymer. However, because the Si—O—Si bonds being produced are between the polymer and the stabilizing agent additive, and not between the polymers themselves, there is no significant increase in Mooney viscosity.

While not bound by any particular theory, it is believed the dialkoxysilane in combination with the base accelerates the coupling reaction. The polymer alkoxysilane end group and the alkoxysilane stabilizing agent are converted to silanols, e.g., in the water desolventizer, with no condensation occurring during that part of the process. After exiting the water desolventizer and dewatering the rubber crumb, the silanols condense and form Si—O—Si bonds. The addition of a base speeds up this reaction to promote reaction between a polymer chain and the stabilizing agent, which sterically inhibits further reaction between polymer chains (i.e., the base catalyzes the reaction of the alkoxysilane with the silanol groups on the polymer chain in competition with or faster than the silanol groups on the polymer chains can react with each other).

In addition to the viscosity stabilizing agent, an antioxidant such as 2,6-di-t-butyl-4-methylphenol or butylated hydoxy toluene (BHT) may be added in solvent (hexane) solution, as is well known in the art. The antioxidant reduces the likelihood that Mooney viscosity instability is due to oxidative coupling.

Optionally, upon termination, the functional terminated polymer could be quenched, if necessary, and dried. Quenching may be conducted by contacting the siloxane terminated polymer with a quenching agent for about 0.05 to about 2 hours at temperatures of from about 30° C. to about 120° C. to insure complete reaction. Suitable well known quenching agents include alcohols, water, carboxylic acids such 2-ethyl hexanoic acid (EHA), acetic acid and the like. Coagulation is typically done with alcohols such as methanol or isopropanol. Alternative to, or in combination with, the step of quenching, the alkoxysiloxane terminated polymer may be drum dried as is well known in the art. The use of steam or high heat to remove solvent is also well known in the art.

The terminal functionalizing agent may be present in a molar ratio (to initiator) of about 0.25 to 2, and preferably about 0.5 to 1. The stabilizing agent may be present in a molar ratio (to initiator) of 0.5 to 50, more typically 1 to 20, preferably 2 to 8.

While polymers according to the present invention may be produced with Mooney viscosity less than 150, less than 120 is preferred, and less than 100 more preferred. Ideally, 40 to 80 is the most preferred target range. Control of increase in Mooney viscosity over time is also one of the real advantages of the present invention. Changes in Mooney viscosity (increases) of less than 20 over a storage period of up to two years is preferred.

The invention is further illustrated by reference to the following examples. It will be apparent to those skilled in the art that many modifications, both to the materials and methods, may be practiced without departing from the purpose and scope of the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

Examples 1 (where OTES is octyl triethoxy silane) and 2 shown in Table 1 are from a continuous polymerization run using two stirred 20 gallon (76 liter) reactors with 105 pounds of hexane capacity at 70.degree. F. (21° C.). The flow was added continuously at 20 wt. % total monomer concentration in hexanes, 37 wt. % of monomer consisting of styrene, 63 wt. % of monomer consisting of butadiene, with a total flow rate of 315 lbs/hr, resulting in 20 minute residence time. The initiator (500 grams/hr. of 3 wt. % n-butyllithium) was added at the bottom of the reactor, with 0.37 molar ratio of 1,2-butadiene/butyllithium, and 0.46 molar ratio of 2,2'-di(tetrahydrofuryl) propane/butyllithium. The first reactor ⅔ temperature (temperature measurement on the side of the reactor approximately at the ⅔ volume point from the bottom) was controlled to 220.degree. F. (104° C.). After the first 20 gallon (76 liter) reactor, 0.51 molar ratio of DMBAPTES to butyllithium was added, and continuously mixed in the second 20 gallon (76 liter) reactor. The polymer samples were collected in a blend tank for 2 hours, then isopropanol was added to quench the active lithium and 1 phr BHT added for antioxidant. Two drums of polymer were extracted for further work. One drum was split into two 5 gallon (19 liter) samples with 18 pounds (8.2 kg) of polymer cement each. The samples were then treated as shown in Table 1. The diaryldialkoxysilane (DPDES) was added to one 5 gallon sample at a molar ratio to BuLi of 2.0, followed by addition of 25 grams of a 25% (wt. %) solution of sodium hydroxide and was stirred with an impeller for 30-60 minutes at room temperature. The samples were then removed and dried. Aging tests were performed by placing the samples in a 100° C. oven for 2 days at ambient humidity. Mooney viscosity tests were performed in a Monsanto Mooney viscometer at 100° C. using a large rotor. See the tables below.

TABLE 1

| Example | Additive | Initial ML4 | Day 1 ML4 | Day 2 ML4 |
|---|---|---|---|---|
| Example 1 | 7 OTES/BuLi | 60.0 | 87.8 | 96.2 |
| Example 2 | 2 DPDES/BuLi, 25 grams 25% NaOH solution | 45.8 | 52.8 | 58.4 |

Examples 3-7 shown in Table 2 are from a continuous polymerization run using two stirred 20 gallon (76 liter) reactors with 105 pounds of hexane capacity at 70° F. (21° C.). The flow was added continuously at 20 wt. % total monomer concentration in hexanes, 37 wt. % of monomer consisting of styrene, 63 wt. % of monomer consisting of butadiene, with a total flow rate of 210 lbs/hr, resulting in 30 minute residence time. The initiator (333 grams/hr. of 3 wt. % n-butyllithium) was added at the bottom of the reactor, with 0.23 molar ratio of 1,2-butadiene/butyllithium, and 0.36 molar ratio of 2,2'-di(tetrahydrofuryl) propane/butyllithium. The first reactor ⅔ temperature was controlled to 210° F. (99° C.). After the first 20 gallon (76 liter) reactor, 0.60 molar ratio of DMBAPTES to bultyllithium was added, and continuously mixed in the second 20 gallon (76 liter) reactor. The polymer samples were collected in a blend tank for 2 hours, then isopropanol was added to quench the active lithium and 1 phr BHT added for antioxidant. Two drums of polymer were extracted for further work. One drum was split into five 5 gallon (19 liter) samples with 18 pounds (8.2 kg) of polymer cement each. The samples were then treated as shown in Table 2.

Figure 2:
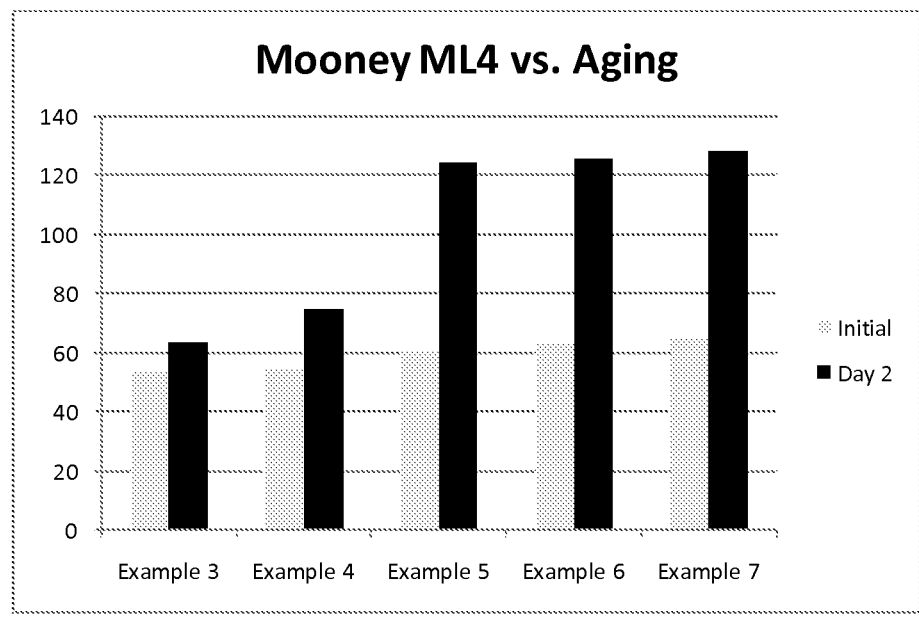
FIG. 2 shows Mooney viscosity and aging data for various samples.

The diaryldialkoxysilane (DPDES) was added to each of the five 5 gallon samples at a molar ratio to BuLi of 2.0, followed by 25% solution of sodium hydroxide as noted. The mixture was stirred with an impeller for 30-60 minutes at room temperature. The samples were then desolvatized at 180° F. (82° C.). The pH of the water in the desovatizer was measured and is listed in table 2 below. The wet crumb was then removed from the desolvatizer and dried in an air oven. The samples were then removed and dried. Aging tests were performed by placing the samples in a 100° C. oven for 2 days at ambient humidity. Mooney viscosity tests were performed in a Monsanto Mooney viscometer at 100° C. using a large rotor. See the table below. The results are also demonstrated graphically in FIGS. 1 and 2.

TABLE 2

| Example | Additive | pH Desolvatizer Water | Initial ML4 | Day 2 ML4 |
|---|---|---|---|---|
| Example 3 | 2 DPDES/BuLi, 50 grams 25% NaOH solution | 9.48 | 53.0 | 63.5 |
| Example 4 | 2 DPDES/BuLi, 25 grams 25% NaOH solution | 9.11 | 54.5 | 74.7 |
| Example 5 | 2 DPDES/BuLi, 10 grams 25% NaOH solution | 8.64 | 60.7 | 124.0 |
| Example 6 | 2 DPDES/BuLi, 2.5 grams 25% NaOH solution | 7.82 | 63.1 | 125.2 |
| Example 7 | 2 DPDES/BuLi, 200 grams water | 7.61 | 64.4 | 128.2 |

The invention is particularly suited for alkoxysilane functional terminated polymers, but is not necessarily limited thereto. The moisture stabilized polymers and method of the present invention can be used separately with other equipment, methods and the like, to produce various polymeric materials or compounds suitable for use in the production of various articles including pneumatic tires and the like, especially in the tread and sidewall portions of the tires. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a polymer comprising,
reacting a conjugated diolefin in a hydrocarbon solvent in the presence of an initiator to form a polymer,
bonding alkoxy silane terminal functionalizing groups to the polymer,
adding an alkoxysilane stabilizing agent to the polymer in combination with an alkaline earth hydroxide and/or a base material selected from the group consisting of lithium hydroxide, potassium hydroxide, sodium alkoxide, potassium alkoxide, aluminum alkoxide, ammonia, sodium hydroxide and mixtures thereof,
and desolvatizing the polymer,
resulting in a polymer with stable Mooney viscosity.

2. The method of claim 1, wherein the alkoxysilane stabilizing agent is a dialkoxysilane.

3. The method of claim 2 including drying the polymer after desolvatizing.

4. The method of claim 1, wherein the desolvatizing is performed by drum drying, direct drying, or steam desolvatizing.

5. The method of claim 4, wherein the stabilizing agent is diphenyldiethoxysilane.

6. The method of claim 4, wherein the stabilizing agent is diphenyldimethoxysilane.

7. The method of claim 1, wherein the stabilizing agent is a diaryldialkoxysilane.

8. The method of claim 1, wherein the initiator is n-butyl lithium.

9. The method of claim 1, wherein the hydrocarbon solvent is one or more hexanes.

10. The method of claim 1, wherein the conjugated diolefin is 1,3-butadiene.

11. The method of claim 1, wherein the polymerizing step includes the presence of an aromatic vinyl compound.

12. The method of claim 11, wherein the aromatic vinyl compound is styrene.

13. A rubber composition containing a filler and the polymer of claim 11.

14. The polymer produced by the process of claim 1.

15. A tire comprising a sidewall and/or a tread containing the rubber of claim 14.

16. The method of claim 1, wherein the alkaline earth hydroxide is calcium hydroxide.

17. A method of making a polymer comprising,
reacting a conjugated diolefin in a hydrocarbon solvent in the presence of an initiator to form a polymer,
bonding alkoxy silane terminal functionalizing groups to the polymer,
adding an alkoxysilane stabilizing agent to the polymer in combination with a base material,
and desolvatizing the polymer,
resulting in a polymer with stable Mooney viscosity, wherein the base material is sodium hydroxide.

* * * * *